United States Patent Office 3,243,340
Patented Mar. 29, 1966

3,243,340
SAG-RESISTANT FIBERBOARD CONTAINING
HYDROPHILIC BINDER
John Edward Cadotte, Cloquet, Minn., assignor to Wood
Conversion Company, St. Paul, Minn., a corporation of
Delaware
No Drawing. Filed Oct. 3, 1960, Ser. No. 60,211
2 Claims. (Cl. 162—135)

The present invention relates to certain kinds of mineral fiberboard and in particular to minimizing the tendency of edge-mounted panels thereof to sag when exposed to a humid atmosphere.

Felted mineral fiberboards of one kind comprise a predominant content of individual mineral fibers bonded fiber to fiber by a normally rigid dried form of a hydrophilic material, commonly some form of starch which is present as a dried residue of an aqueous colloidal form of the starch, such as gelatinized starch. One way so to bind the fibers is to include gelatinized or pasted starch in an aqueous slurry of fibers which is dewatered and felted on a screen to a wet mat for drying to a board. Another way is to include starch grains, or flour containing starch grains, in the slurry, and to gelatinize the starch in the wet mat by heating the mat throughout at a gelatinizing temperature before drying the mat to produce a board. Also, it is known to include both gelatinized starch and starch grains in the wet mat and to process the mat and starch grains as stated above.

It is a conventional practice horizontally to mount panels of such starch-bonded mineral fiberboards in relatively large sizes, such as 2 x 4 feet, in ceilings, by fixing only the edges of a panel. In a humid atmosphere, such a mounted panel has a tendency to sag. The sag is attributed to the hydrophilic character of the binder and its absorption of moisture vapor, in the manner well-known to wearers of starched clothing in hot, humid summer days. Mineral fibers in a mineral fiberboard are impregnable solids, and the starch binder is present as thin films or bodies over fibers and at fiber junctions. The rigidity of such starch films and bodies is lessened as the starch absorbs water from moisture in the atmosphere, and further lessened as the temperature is increased.

The present invention has for its object a treatment of the board to minimize the tendency to sag at high humidity.

Studies of sagging have led to two types of processing to minimize the described tendency to sag. One is an internal treatment involving an additive to the board composition. The other, which is the subject of the present invention, is an external treatment. Each method may be made effective when used alone, and both methods may be effectively combined, thus permitting in such a combination a lessening of the extent to which each method is practiced from that when used alone for the same end result. This is illustrated by practicing the external treatment in the same way on two boards, one without the internal treatment, and one with it. The combined treatments give a greater resistance to sag than either treatment alone.

According to the present invention, a finished board of felted synthetic mineral fiberboard bonded fiber-to-fiber by starch has the fibers at and adjacent one face treated with moisture-resistant thermoset resin in such a way that at least the fibers at and adjacent the surface of the board and the starch bonds thereof are coated with moisture-resistant thermoset resin present in quantity such that the so-coated fibers and bonds provide a continuous structure resistant to the forces of tension or compression, as the case may be, of the order resulting from sagging of a panel mounted only at opposite edges. The rigid structure preferably has continuity from edge to edge of the board, yet it may have small areas of discontinuity spotted over the face of the board, within limits so that said resistance to sagging is not lost. For example, such a structure in the form of an open-mesh network will function, as hereinafter explained.

The term mineral fiberboard in general comprehends boards with internal porosity made only of synthetic mineral fibers and boards made of synthetic mineral fibers admixed with natural mineral fibers or cellulosic fibers, or both. As used herein, the term "mineral fiberboard" signifies a board formed of 100 parts of feltable fibers of which at least 75 parts are synthetic mineral fibers, the remainder being other feltable fibers. Said other fibers are preferably selected from natural mineral fibers and cellulosic fibers so that the board is a fire-resistant one, as when there are from 0 to 10 parts of cellulosic fibers and the remainder is mineral fibers of which 2 to 15 parts may be asbestos fibers. The term also includes binder in the form of starch preferably gelatinized and dried in situ in a wet felt, resulting from dewatering an aqueous slurry of said 100 parts of feltable fibers and from 5 to 20 parts of starch grains. The slurry is so constituted by the use of thickening agent that for the felting aparatus employed from 80% to 90% of the starch grains is retained in the welt felt.

In so forming a felt, some of the water of the slurry drains away and more is removed by compressing the felt formed by drainage. The dewatering by drainage and compression is controlled to form wet felts which when dried form boards with a density in the range from 12 to 30 pounds per cu. ft., and a thickness in the range from ⅜ to 1 inch. The resulting boards are internally porous and are the boards to which the present invention applies.

The resin may be applied once to the wet mat or to the dry mat, or twice, the first time to the wet mat and then to the dry mat. In pressing the mat to dewater, the mat rests on a screen conveyer which leaves a screen-image impression on the wet mat when removed from the conveyer. It is conventional to remove wet mats from a screen-conveyer on which it is formed, across an open space onto a screen-conveyer to carry the mat through an oven. In this open space, resin may be applied to the screen-marked face, as by a coating roll or sprayer for liquid resin compositions. When a coating roll is used it may be operated so as to coat only the high spots of the screen image for the acoustic advantages referred to hereinafter. Thus, on passing the resin-coated face through the drying oven, the starch grains are gelatinized, and the resin is thermoset as the wet mat is dried.

The term "moisture-resistant" as used herein with reference to the applied agent, means physical stability with varying humidity, such that the material neither expands nor shrinks appreciably, and does not change in its flexing characteristics. As a result, when such moisture-resistant material coats fibers and the bonds thereof, it rigidifies the structure against flexing as a result of any moisture absorbed by the starch bonds.

The use of unadulterated resin gives excellent sag-resistance. In practice, however, a clay is preferred as a diluent to reduce the usage of such resin, and when the resin is used as an aqueous composition, bentonite or other clay or other added thickening agents or any mixture of these, may be used in amount to give the composition of proper consistency for the method of application, such as by a coating roll, as later described.

The invention is not limited to fluid compositions for applying resin. Powder forms of fusible thermosetting resin or mixtures containing it, may be applied to the face of a wet board-forming mat or of a dried and completed board, followed by fusing and thermosetting the resin. However, mechanical problems are encountered in applying a controlled amount uniformly, so that fluid compositions are preferred.

Although the invention may be practiced by forming a film-like coat over the entire face of a board, satisfactory results may be obtained by such a low usage of material that no film-like layer is formed, so long as a sufficient content of fibers at and near the surface is coated and integrated into a continuous sheet or network resistant to tension and compression. The continuous structure may be a closed one, or may be foraminous with openings therein, at which some fibers and some bonds thereof are not coated as described hereinafter. By forming a foraminous resin-coated fiber layer at and adjacent the surface of an acoustically porous board, the board may pass sound waves from its body through the foramens of said layer with important acoustic advantage.

The preferred material for the coated fibers and bonds of the completed board is a resin which has been thermoset, which resin is not subject to softening or moving with changes in humidity of the surrounding atmosphere, such resin being an example of moisture-resistant material. As a result, the bonds and fibers at the surface and immediately adjacent thereto, which are coated by the resin, become relatively fixed in position each one with respect to its neighbors. When the treated face is on the upper side of an edge-mounted panel, where sagging tends to compress the surface layer, the fibers are so fixed as to resist the resulting compressive force and thereby minimize the tendency to sag. When the treated face is on the underside of an edge-mounted panel, the surface layer tends to be stretched by sagging. The continuous structure of the resin-coated fibers and bonds resists the resulting tendency to stretch and thereby minimizes the tendency to sag.

It has been found that the resin-treated surface layer is more resistant to compression than to tension, making it preferable and more economical to apply the resin to the upper or hidden face of a mounted panel. This has the advantage of permitting the under or exposed face to be variously treated. One manner of treatment is the use of other coating materials for decorative effects, which coating materials need not have the moisture-resisting properties of the thermosetting resin, although they may with advantage in further minimizing sag. Another manner of treating the exposed face is to drill or punch a multiplicity of holes into an acoustically porous board for sound absorption.

Among the resins employed are the following commercial resins, hereinafter referred to in examples:

Resin A—Low-molecular weight condensation resin of 1 mole of melamine and 3 moles of formaldehyde. Water-insoluble white powder. Preferably suspended in water with clay.
Resin B—A urea-formaldehyde resin modified with amine, and having 12.8% nitrogen content. Available in 10% aqueous solution as "Kymene 557" from Hercules Powder Company, Wilmington, Delaware.
Resin C—Solid fusible thermosetting phenol-formaldehyde resin useful as a powder.

The coating material may be applied to a wet pressed felt of mineral fibers and starch binder, which is to be dried to form the board, followed by drying the wet felt and the resin-coating composition, if it is an aqueous one. The drying is carried out at a temperature suitable for thermosetting the resin content of the coating material, such as 300° to 600° F., for a melamine-formaldehyde resin. However, it is preferred to apply the coating material to a dry board. This permits better mill practice in making large panel units of dry board, cutting the panel into tile-sizes, such as 12 x 12 inches, or 2 x 4 feet, spraying a succession of tile-sizes, and passing the succession through a curing oven.

When the board is made on a Fourdrinier machine, the wire screen thereof may be selected so that it leaves a screen-impression on one face of the board. The resulting surface has miniature high and low spots as the screen-impression, and a coating composition may be applied, especially by roll-coating, so that a foraminous network of resin-coated fibers and bonds is formed with the low spots of the screen-image free from resin. When such a coated board is acoustically porous, the porosity is exposed at the coated face in these low spots, thus permitting sound waves to exit from the body of the board at the coated face when used as the back of the tiles.

The fact that the resin-coat at the back of the board is more efficient in imparting sag-resistance than when it is on the exposed face of the board, makes it acoustically beneficial to have a foraminous resin layer as described. However, the invention is not limited to the resin layer at the back face, as evidenced by the following results:

Uncoated felted mineral fiber tiles 12 x 12 inches cut from a panel formed on a Fourdrinier machine, were coated on the wire-formed surface (called the tile back) with a mixture of 2 parts of melamine-formaldehyde Resin A and 1 part of bentonite clay in 10 parts of water, using 15 pounds of the solids per M sq. feet. The mixture was heated to 310° F., to thermoset the resin.

Uncoated and coated tiles 12 x 12 inches and .580 inch thick were compared by mounting them horizontally at the edges and exposing to the same conditions of high humidity, with results as follows:

TABLE I

|  | Saging in inches | |
| --- | --- | --- |
|  | Back up | Back down |
| Uncoated tile | .047 | .030 |
| Tile with coated back | .006 | .018 |

The results show that the uncoated tile has less tendency to sag when its wire-formed back surface is exposed, than when reversed. But, this is the least desirable position. The resin coat is more effective in minimizing sag in the position, wherein the tendency to sag is greatest.

The following examples further illustrate the invention.

Dry tiles 12 x 12 x .580 inch, some coated on the back, and others uncoated, were tested for sag by exposure to 90% relative humidity at 90° F., for 48 hours. The extent of sag and the coatings are tabulated in the following Table II.

TABLE II

| Example | Coating | Pounds usage per M sq. ft. | Inches sag |
| --- | --- | --- | --- |
| 1 | None (Control A) |  | .132 |
| 2 | 2 parts Resin A, 1 part Bentonite. | 12 | .009 |
| 3 | 2 Parts Resin A | 12 | .021 |
| 4 | 2 parts dimethylol urea, 1 part Bentonite. | 13.2 | .090 |
| 5 | 2 parts Resin B, 1 part Bentonite. | 12 | .069 |
| 6 | None (Control B) |  | .067 |
| 7 | Powdered Resin C | 10 | .035 |
| 8 | Resin C in Isopropanol | 10 | .039 |

Examples 1 to 5 were on a board A of one batch and Examples 6 to 8 were on board B of another batch. The board was made from a slurry containing 97 parts of slag wool, 3 parts of sulfite fiber and 13 parts of tapioca starch.

In my copending application Serial No. 63,960, filed October 21, 1960, now Patent No. 3,146,156, the abovementioned internal tereatment is described and claimed. Therein it is shown that sag may be minimized by inclusion in the body of the tile of a magnesium compound selected from the group consisting of magnesium oxide, magnesium carbonate, magnesium hydroxide and basic magnesium carbonate. The internal treatment may be combined with the external treatment of the present invention.

*Example 9*

A Fourdrinier mineral fiberboard in tile form 2 x 4 ft. x .580 inch having a density of 18 to 22 lbs. per cu. ft., has been made from a slurry containing material as follows:

|                | Parts by weight |
|---|---|
| Slag wool | 92.5 |
| Asbestos | 2.5 |
| Starch | 15.0 |
| Sulfite pulp | 5.0 |
| Magnesium oxide | 4.0 |

It is coated on the back with 5 lbs. of solids per M sq. ft. of a composition as follows:

|  | Parts |
|---|---|
| Resin A | 2 |
| Bentonite | 1 |
| Water | 10 |

Comparative sag tests were made, including a similar board lacking in the magnesium compound, and were as follows:

| Example | Board | Inches sag |
|---|---|---|
| 9a | No. 1 with MgO | .45 |
| 9b | No. 2 (no MgO) | 1.3 |
| 9c | No. 1 Coated | .25 |
| 9d | No. 2 Coated | .50 |

*Example 10*

A basic board composition for a slurry to be felted on a Fourdrinier machine was made as follows:

|  | Parts by weight |
|---|---|
| Slag wool fiber | 94.5 |
| Amosite fiber | 2.5 |
| Sulfite cellulose fiber | 3.0 |
| Tapioca starch grains | 13.0 |
| Solids of aqueous wax-size* | 1.0 |

*As disclosed in Olson U.S. Patent No. 2,754,206.

The draining of the slurry and the pressing of the wet mat may be so controlled as to produce the desired density of internally porous board, for example 12 to 30 pounds per cu. ft., after gelatinizing the starch in situ in the wet mat and then drying. For the particular tests given below, a dried board was formed having a density in the range from 18 to 20 pounds per cu. ft., and a thickness of 0.560 inch.

Test pieces 3 x 8 inches were cut and the two ends supported horizontally on ½-inch steel bars, with a sand bag weighing three times the weight of the tile placed as a center load, oved a lengthwise extent of about 3 inches. Pieces to be compared were subjected side by side to two separated 24-hour periods of 90 to 97% relative humidity.

The composition given above forms control test pieces which may vary somewhat from batch to batch.

Samples A and B are from boards of the same formulation containing in addition 4 parts of calcined magnesite and 4 parts of magnesium hydroxide, respectively, and were tested in sizes 3 x 8 inches. Samples C and D correspond, respectively to Samples A and B coated on the back with 8.7 pounds per M sq. ft. of Resin A, and were tested in sizes 2 x 4 feet.

The tested deflections as sag is shown as follows:

|  | Sag in inches | Percent reduction in sag from sag of control |
|---|---|---|
| Sample A | 0.031 | 78.2 |
| Its control | 0.142 |  |
| Sample B | 0.020 | 79 |
| Its control | 0.099 |  |
| Sample C | 0.432 | 62.6 |
| Sample D | 0.076 | 93.4 |
| Do | 0.088 | 92.4 |
| Do | 0.239 | 79.3 |
| Their control | 1.154 |  |

In each instance, the improvement is measured against the particular control sample simultaneously tested. The improvement in sag-resistance is greater when the internal and external treatments are combined.

*Example 11*

A felted mineral fiberboard is coated on the back surface with a usage of 15 pounds of solids per M sq. ft., of the following composition:

|  | Parts by weight |
|---|---|
| Methyl cellulose (15 centipoises) | 0.74 |
| Methyl cellulose (4000 centipoises) | 0.34 |
| Sodium tripolyphosphate | 0.25 |
| Resin A | 73.9 |
| Kaolin clay | 24.6 |
| Water | 1250 |

The composition is roll-coated onto a dry board and the coated board dried by passing it through an oven at 350° F., in one minute. When exposed to the following sequence of conditions, no sag occurred:

1 day at normal room temperature and humidity.
1 day at normal room temperature and humidity of 90–95%.
1 day at normal room temperature and humidity.

*Example 12*

A substitute composition for Example 11 is as follows:

|  | Parts by weight |
|---|---|
| Water | 1120 |
| Carboxymethyl cellulose, 1.5 cps. | 6.75 |
| Carboxymethyl cellulose, 4000 cps. | 3.37 |
| Antifoaming agent (optional) | 1.5 |
| Resin A | 675 |
| Kaolin clay | 225 |

Although the invention has been explained with reference to a particular range of composition for mineral fiberboard, it has also been successfully applied and tested on commercial mineral fiber tile in the market, known to be bonded by starch, but otherwise of unknown composition. Accordingly, the invention is set forth in the claims as directed to starch-bonded mineral fiberboard without intention to limit the invention to the illustrative examples. Furthermore, it is to be understood that the invention may be applied to the entire face of a tile except one or more marginal edges or a marginal band. To leave one or more bands untreated with resin is a practice contemplated as falling within the scope of the invention as set forth in the appended claims.

I claim:

1. In a rectangular unit of fiberboard comprising a porous board of felted fibers and hydrophilic binder for said fibers, which unit has at least two opposite edges adapted for mounting the unit horizontally, and which is characterized by softening of the said binder at high humidity thus inducing said unit when mounted horizontally only at said opposite edges to sag, the improvement in which fibers and inter-fiber bonds at and adjacent a surface of the unit are coated with thermoset moisture-resistant resin forming a continuous resinous structure over the area of said surface of the unit between said opposite edges, and in which said resinous structure is foraminous with a multiplicity of isolated areas in said surface, said areas containing fibers and inter-fiber bonds not coated with said thermoset resin, whereby said isolated areas exhibit porosity continuous with the porosity of the body of the unit for transmitting through said areas sound waves entering said unit at the opposite surface.

2. In a rectangular unit of fiberboard comprising a porous board of felted fibers and hydrophilic binder for said fibers, which unit has at least two opposite edges adapted for mounting the unit horizontally, and which is characterized by softening of the said binder at high humidity thus inducing said unit when mounted horizontally only at said opposite edges to sag, the improvement in which fibers and inter-fiber bonds at and adjacent a surface of the unit are coated with thermoset moisture-resistant resin forming a continuous resinous structure over the area of said surface of the unit between said opposite edges, and in which said resinous structure is foraminous with a multiplicity of isolated inset areas in said surface, said areas containing fibers and inter-fiber bonds not coated with said thermoset resin, whereby said continuous resinous structure has foramens formed by said inset areas, whereby said inset areas exhibit porosity continuous with the porosity of the unit for transmitting through said areas sound waves entering said unit at the opposite surface.

References Cited by the Examiner

UNITED STATES PATENTS

| | | | |
|---|---|---|---|
| 2,217,005 | 10/1940 | Clapp | 162—145 |
| 2,225,100 | 12/1940 | Clapp | 162—145 |
| 2,409,628 | 10/1946 | Heritage | 152—184 |
| 2,409,629 | 10/1946 | Heritage | 117—155 |
| 2,633,433 | 3/1953 | Hollenberg | 162—155 |
| 2,717,830 | 9/1955 | Bjorkman | 162—175 |
| 2,732,295 | 1/1956 | Hollenberg | 162—145 |
| 2,773,763 | 12/1956 | Scott | 162—145 |

DONALL H. SYLVESTER, *Primary Examiner.*

RICHARD D. NEVIUS, MORRIS O. WOLK,
*Examiners*

S. L. BASHORE, *Assistant Examiner.*